(12) United States Patent
Seokhun et al.

(10) Patent No.: US 10,552,252 B2
(45) Date of Patent: Feb. 4, 2020

(54) PATTERNED BIT IN ERROR MEASUREMENT APPARATUS AND METHOD

(71) Applicant: Seagate Technology LLC, Cupertino, CA (US)

(72) Inventors: Jeon Seokhun, Kyunggi-do (KR); Oh Sungchul, Gyeonggi-do (KR); Jung Pil-Woo, Kyunggi-do (KR); Jeong Seungyoul, Gyeonggi-do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 233 days.

(21) Appl. No.: 15/250,617

(22) Filed: Aug. 29, 2016

(65) Prior Publication Data

US 2018/0060161 A1   Mar. 1, 2018

(51) Int. Cl.

| G06F 11/00 | (2006.01) |
|---|---|
| G06F 11/10 | (2006.01) |
| G11B 20/18 | (2006.01) |
| G06F 3/06 | (2006.01) |
| G11B 7/095 | (2006.01) |
| G11B 21/08 | (2006.01) |
| G11B 20/12 | (2006.01) |

(52) U.S. Cl.
CPC ........ *G06F 11/1004* (2013.01); *G06F 3/0619* (2013.01); *G06F 3/0679* (2013.01); *G11B 20/1816* (2013.01); *G11B 7/0956* (2013.01); *G11B 21/083* (2013.01); *G11B 2020/1244* (2013.01)

(58) Field of Classification Search
CPC .... G06F 11/1004; G06F 3/0619; G06F 3/064; G06F 3/0679; G06F 17/30218; G11B 7/0956; G11B 2020/1244; G11B 21/083
USPC .......................................... 714/763–766, 768
See application file for complete search history.

(56) References Cited

U.S. PATENT DOCUMENTS

| 4,200,838 A | * | 4/1980 | Poitevin | H04L 1/241 |
|---|---|---|---|---|
| | | | | 714/704 |
| 5,282,211 A | * | 1/1994 | Manlick | H04J 3/0611 |
| | | | | 714/707 |
| 6,215,831 B1 | | 4/2001 | Nowack et al. | |
| 6,603,617 B1 | | 8/2003 | Cross | |
| 6,614,735 B2 | | 9/2003 | Shoji et al. | |
| 8,031,423 B1 | | 10/2011 | Tsai et al. | |
| 8,381,076 B2 | | 2/2013 | Radke | |
| 8,560,922 B2 | | 10/2013 | Bivens et al. | |
| 8,644,099 B2 | | 2/2014 | Cometti et al. | |
| 8,732,555 B2 | | 5/2014 | Camalig et al. | |
| 8,737,136 B2 | | 5/2014 | Cometti | |
| 8,885,277 B1 | * | 11/2014 | Erden | G11B 20/1403 |
| | | | | 360/39 |
| 9,036,413 B2 | * | 5/2015 | Wu | G11C 16/349 |
| | | | | 365/185.03 |
| 9,195,533 B1 | | 11/2015 | Yang et al. | |

(Continued)

*Primary Examiner* — Albert Decady
*Assistant Examiner* — Osman M Alshack
(74) *Attorney, Agent, or Firm* — Westman, Champlin & Koehler, P.A.

(57) ABSTRACT

A method includes detecting different data patterns in data read from a portion of a non-transitory data storage medium. Bit errors in the different data patterns are then determined. Further, bits in error for a total number of bits in each of the different data patterns are calculated from the determined bit errors in the different data patterns.

19 Claims, 6 Drawing Sheets

(56) References Cited

U.S. PATENT DOCUMENTS

| | | | |
|---|---|---|---|
| 2003/0067998 A1* | 4/2003 | Nakajima | G11B 20/1816 375/341 |
| 2005/0257104 A1* | 11/2005 | Wood, Jr. | G01R 31/3171 714/704 |
| 2006/0233287 A1* | 10/2006 | Yang | G11B 20/10046 375/341 |
| 2008/0165446 A1 | 7/2008 | Partee | |
| 2008/0239560 A1 | 10/2008 | Yakuwa et al. | |
| 2009/0091990 A1 | 4/2009 | Park et al. | |
| 2011/0075478 A1 | 3/2011 | Yoon et al. | |
| 2011/0216590 A1 | 9/2011 | Eun et al. | |
| 2011/0255377 A1* | 10/2011 | Abe | G04R 20/10 368/47 |
| 2012/0224420 A1 | 9/2012 | Sakurada et al. | |
| 2012/0311406 A1 | 12/2012 | Ratnam et al. | |
| 2013/0027801 A1 | 1/2013 | Kumar et al. | |
| 2014/0129909 A1* | 5/2014 | Rotker | G06F 11/10 714/799 |
| 2014/0211336 A1* | 7/2014 | Liao | G11B 20/10027 360/40 |
| 2014/0281820 A1 | 9/2014 | Alrod et al. | |
| 2015/0095565 A1* | 4/2015 | Morris | G06F 13/1689 711/109 |
| 2015/0347227 A1* | 12/2015 | Rabenalt | G06F 3/0679 714/764 |

\* cited by examiner

PATTERNED BIT IN ERROR MEASUREMENT APPARATUS AND METHOD

BACKGROUND

Data storage/memory devices are one of many components of modern computers. Examples of data storage devices include hard disk drives (HDDs), which are electromechanical devices containing spinning discs and movable read/write heads, solid state drives (SSDs) with no moving parts, and hybrid drives, which combine features of HDDs and SSDs in one unit.

In HDDs and hybrid drives, digital information bits are stored on the disc(s) in concentric tracks that are divided into sectors. Information bits are written to and read from the disc(s) by the movable read/write heads. Some stored bits that are read from the disc(s) by the read/write heads may be altered due to noise, interference, distortion, etc. The altered bits or bit errors may negatively impact performance of the data storage device.

SUMMARY

The present disclosure relates to techniques for determining bits in error and corresponding bit error rates from bit patterns detected in data read from portions of data storage media.

In one method embodiment, different data patterns in data read from a portion of a non-transitory data storage medium are detected. Bit errors in the different data patterns are then determined. Further, bits in error for a total number of bits in each of the different data patterns are calculated from the determined bit errors in the different data patterns.

This summary is not intended to describe each disclosed embodiment or every implementation of the patterned bit in error measurement technique. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments described below relate to determining bits in error (BIE) and corresponding bit error rates (BER) from bit patterns detected in data read from portions of data storage media employed in disc drives, solid state memories, etc. Before providing details regarding the different embodiments, one example of a disc drive in which at least some of the embodiments are useful is described below in connection with FIG. 1.

Figure 1:
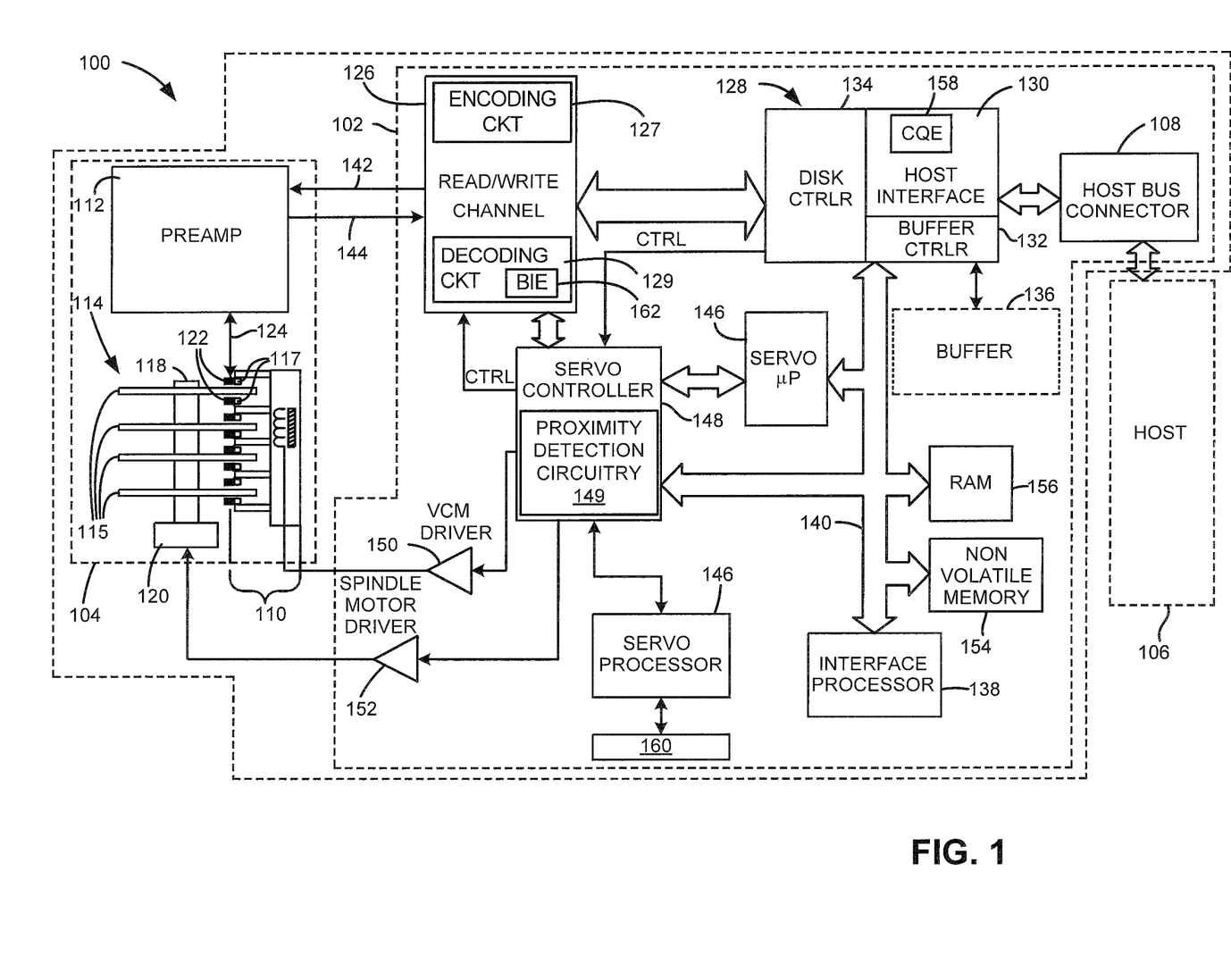
FIG. 1 is a block diagram of a disc drive in accordance with one embodiment.

FIG. 1 is a block diagram of a disc drive 100. Disc drive 100 includes a printed circuit board assembly (PCBA) 102 and a head-disc assembly (HDA) 104. PCBA 102 includes circuitry and processors, which provide a target interface controller (or drive controller) for communicating between a host system 106 and HDA 104. Host system 106 can include a microprocessor-based data processing system such as a personal computer or other system capable of performing a sequence of logical operations. Data is transmitted between host system 106 and PCBA 102 via a host bus connector 108. HDA 104 includes an actuator assembly 110, a preamplifier 112, and a disc assembly 114. Disc assembly 114 includes one or more media discs 115, stacked on a spindle assembly 118. Spindle assembly 118 is mechanically coupled to a spindle motor 120 for rotating the disc(s) 115 at a high rate of speed.

Actuator assembly 110 includes a voice coil motor, and multiple actuator arms. Located at the end of each actuator arm are one or more sliders/transducer heads such as 122, which are associated with a respective disc surface. Transducer heads 122 communicate with disc controller circuit board 102 via a cable assembly 124 connected to preamplifier 112 for reading and writing data to the transducer head's associated disc surface. Preamplifier 112 provides an amplified signal to a read/write channel 126 of PCBA 102. Read/write channel 126 performs encoding and decoding of data written to and read from the disc. Encoding of source data received from, for example, host 106 may be carried out by any suitable encoding circuitry 127. Similarly, decoding of data read from the disc(s) 115 may be carried out by suitable decoding circuitry 129. In the interest of simplification, details regarding encoding circuitry 127 and decoding circuitry 129 are not provided in FIG. 1.

A servo processor 146 provides intelligent control of actuator assembly 110 and spindle motor 120 through a servo controller 148. By commands issued to servo controller 148 by servo processor 146, VCM driver 150 is coupled to move actuator assembly 110 and spindle motor driver 152 is coupled to maintain a substantially constant spin rate of spindle motor 120.

PCBA 102 includes a host interface disc controller (HIDC) application-specific integrated circuit (ASIC) 128. ASIC 128 includes a host interface 130, a buffer controller 132, and a disc controller 134. Host interface 130 communicates with host system 106 via host bus connector 108 by receiving commands and data from and transmitting status and data back to host system 106. A command queuing engine (CQE) 158 is incorporated in host interface 130.

Buffer controller 132 controls a non-volatile buffer memory 136. Disc controller 134 tracks the timing of data sectors passing under a currently selected transducer head and accordingly sends data to and receives data from read/write channel 126.

An interface processor 138 manages a queue of commands received from host 106 with the assistance of the CQE 158 embedded in host interface 130. Interface processor 138 interfaces with functional elements of PCBA 102 over a bus 140, for transfer of commands, data, and status.

Disc system operational programs may be stored in non-volatile program storage memory 154, such as read-only memory (ROM) or flash memory, and are loaded into random access memory (RAM) or program loading memory 156 for execution by interface processor 138. Suitably, servo processor 146 may have integrated or separate memory 160 for storage of servo programs.

As mentioned above, read/write channel 126 performs encoding and decoding of data written to and read from the disc. In one embodiment, decoding circuitry 129 within read/write channel 126 includes BIE calculation circuitry 162. BIE calculation circuitry 162 detects different data patterns in data read from a portion of the disc(s) 115. Bit errors in the different data patterns are then determined by BIE calculation circuitry 162. Further, BIE for a total number of bits in each of the different data patterns are calculated by circuitry 162 from the determined bit errors in the different data patterns. BIE calculation circuitry 162 then determines BIE for a total number of bits in all of the different data patterns from the separately calculated BIE for each of the different data patterns. In some embodiments, the portions of the discs for which BIE calculations are made by circuitry 162 may include individual sectors, multiple sectors, individual tracks, multiple tracks, etc. These different disc portions are described below in connection with FIG. 2.

Figure 2:
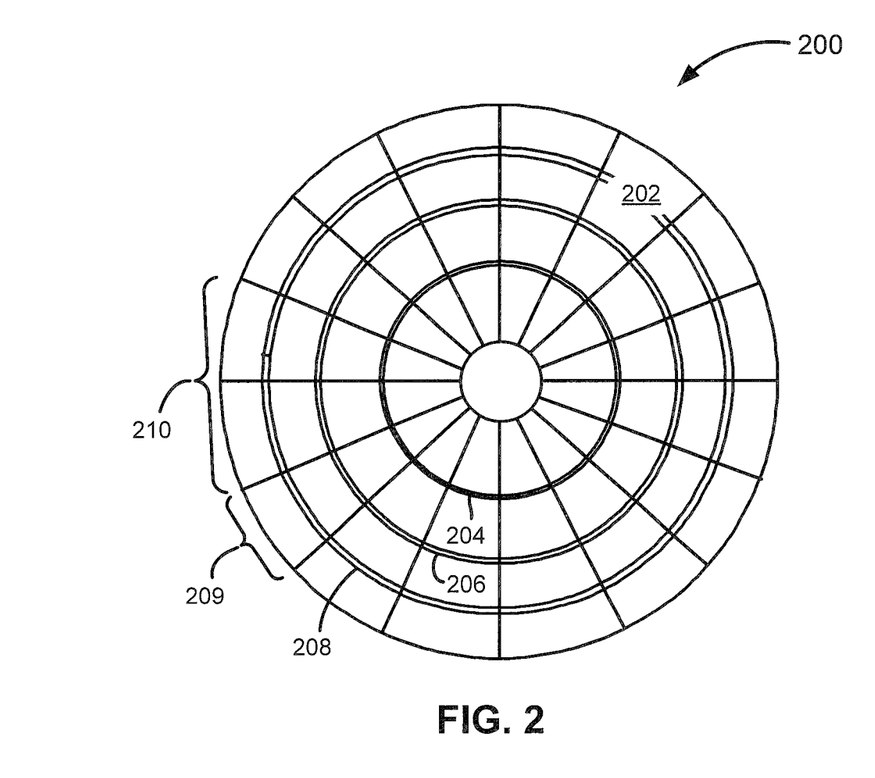
FIG. 2 is a diagrammatic representation of a simplified top view of a disc included in the disc drive of FIG. 1.

FIG. 2 is a diagrammatic representation of a simplified top view of a disc 200 having a surface 202 which may be used in conjunction with a sectored servo system (also known as an embedded servo system) according to a specific example. Disc 200 can be, for example, a single disc of disc pack 114 of FIG. 1. As illustrated in FIG. 2, disc 200 includes a plurality of concentric tracks 204, 206 and 208 for storing data on the disc's surface 202. Although FIG. 2 only shows a small number of tracks (e.g., 3 tracks) for ease of illustration, it should be appreciated that typically many thousands of tracks are included on the surface 202 of disc 200.

Each track 204, 206 and 208 is divided into a plurality of sectors 209. Each of sectors 209 are typically divided into a servo portion and a data storage portion. In the interest of simplification, the servo and data storage portions are not shown separately. In some embodiments, sectors 209 may be grouped into segments 210. For example, each segment 210 may include two sectors 209. However, different embodiments can have segments 210 that have any suitable number of sectors 209, which can include a single sector or a plurality of sectors. Also, in some embodiments, each of sectors 209 may be divided into multiple segments. Further, in some embodiments, different ones of segments 210 on disc surface 202 can have different sizes (e.g., each different segment 210 can include a different number of sectors 209). Details regarding determining BIE and BER for a segment in accordance with one embodiment are provided below in connection with FIG. 3.

Figure 3:
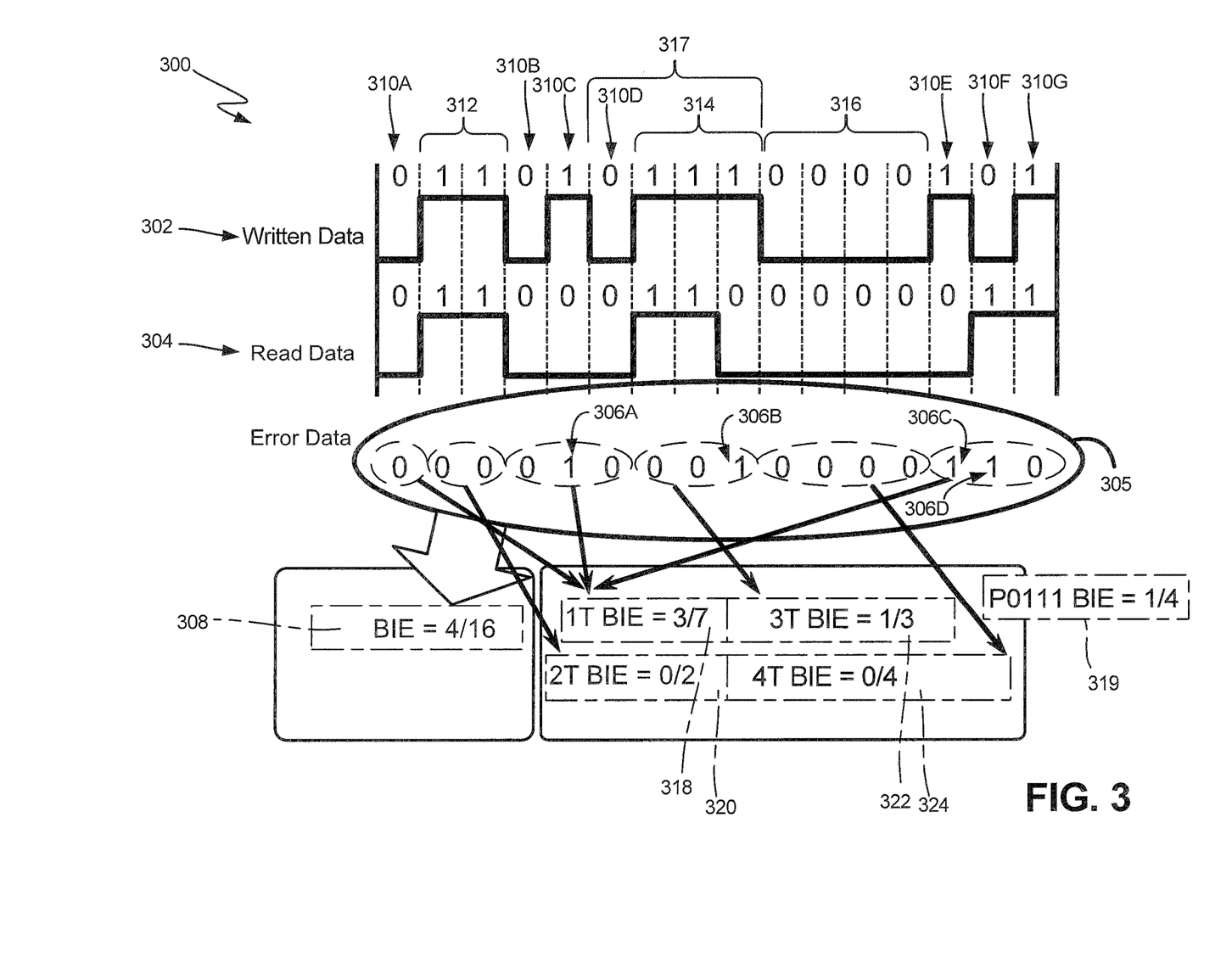
FIG. 3 is a diagrammatic illustration showing a comparison of pattern-independent and pattern-dependent bit in error (BIE) calculations carried out for a segment of a data storage medium.

FIG. 3 is a diagrammatic illustration 300 showing a comparison of pattern-independent and pattern-dependent BIE calculations carried out for a segment of a data storage medium. In the example of FIG. 3, the data segment is a 16-bit segment, which has a written data pattern 302. A read operation carried out on written data pattern 302 provides read data 304. Errors are detected when data bits in the read data 304 do not match corresponding data bits in written data pattern 302. The written data (e.g., pattern 302) may initially be unknown to a reader (e.g., read circuitry within HDA 104 and read/write channel 126 of FIG. 1), but with multiple iterations of, for example, a low-density parity-check (LDPC) decoder within decoding circuitry 129 of FIG. 1, the read data will be corrected to the written data (e.g., pattern 302). In FIG. 3, read data 304 is data initially obtained from a reader with, for example, only one iteration of the LDPC decoder (e.g., read data 304 from the LDPC decoder obtained before error correction operations are carried out on the read data 304). In the example of FIG. 3, a comparison of the written data pattern 302 and the read data 304 is shown as a comparison bit pattern 305. In comparison bit pattern 305, a 0 is indicative of the absence of a bit error and a 1 is indicative of the presence of a bit error. In comparison bit pattern 305, there are four 1s 306A, 306B, 306C and 306D, which show that there are four bit errors present.

One pattern-independent technique for determining BIE calculates the BIE for the entire segment by only considering the total number of bits read (e.g., total bit count for the segment) and the total number of bit errors (e.g., bit error count). Thus, using that pattern-independent technique, the BIE obtained for the segment is 4/16, which is denoted by reference numeral 308 in FIG. 3. A bit error rate (BER) for the segment may be calculated according to Equation 1 below.

$$BER = \log_{10}(\text{Bit error count}/\text{Total bit count}) \quad \text{Equation 1}$$
$$= \log_{10} BIE$$

One embodiment of the disclosure recognizes that BIE can vary based on variations in data patterns. Data patterns may have different frequencies and different configurations of bits. In the example of FIG. 3, patterns 310A through 310G are 1T patterns (where T is a period), pattern 312 is a 2T pattern, pattern 314 is a 3T pattern, and pattern 316 is a 4T pattern. In such a pattern-dependent embodiment, BIE calculation circuitry (such as 162 of FIG. 1) detects pattern 310A-310G (1T), pattern 312 (2T), pattern 314 (3T) and pattern 316 (4T). As can be seen in FIG. 3, there are three bit errors (306A, 306C and 306D) out of a total of seven bits (310A through 310G) in the 1T pattern, and therefore the 1T BIE 318 is 3/7. There are no bit errors in the 2T pattern 312 and in the 4T pattern 316, and thus the 2T BIE 320 and the 4T BIE 324 are both zero. There is one bit error (306B) out of three bits (314) and therefore BIE 322 for the 3T pattern is 1/3. The individually calculated BIEs 318, 320, 322 and 324 may then be summed to obtain the BIE for the 16-bit segment. In addition to data patterns being categorized in terms of different frequencies as described above, in another embodiment of the disclosure, different configurations of bits can be used to categorize the data patterns. For example, BIE calculation circuitry may detect patterns with specific bit configurations, such as pattern 317 (0111) and find an error bit in that pattern (e.g., P0111 BIE 319, which is 1/4). Details of BIE calculation circuitry in accordance with one embodiment are provided below in connection with FIG. 4.

Figure 4:
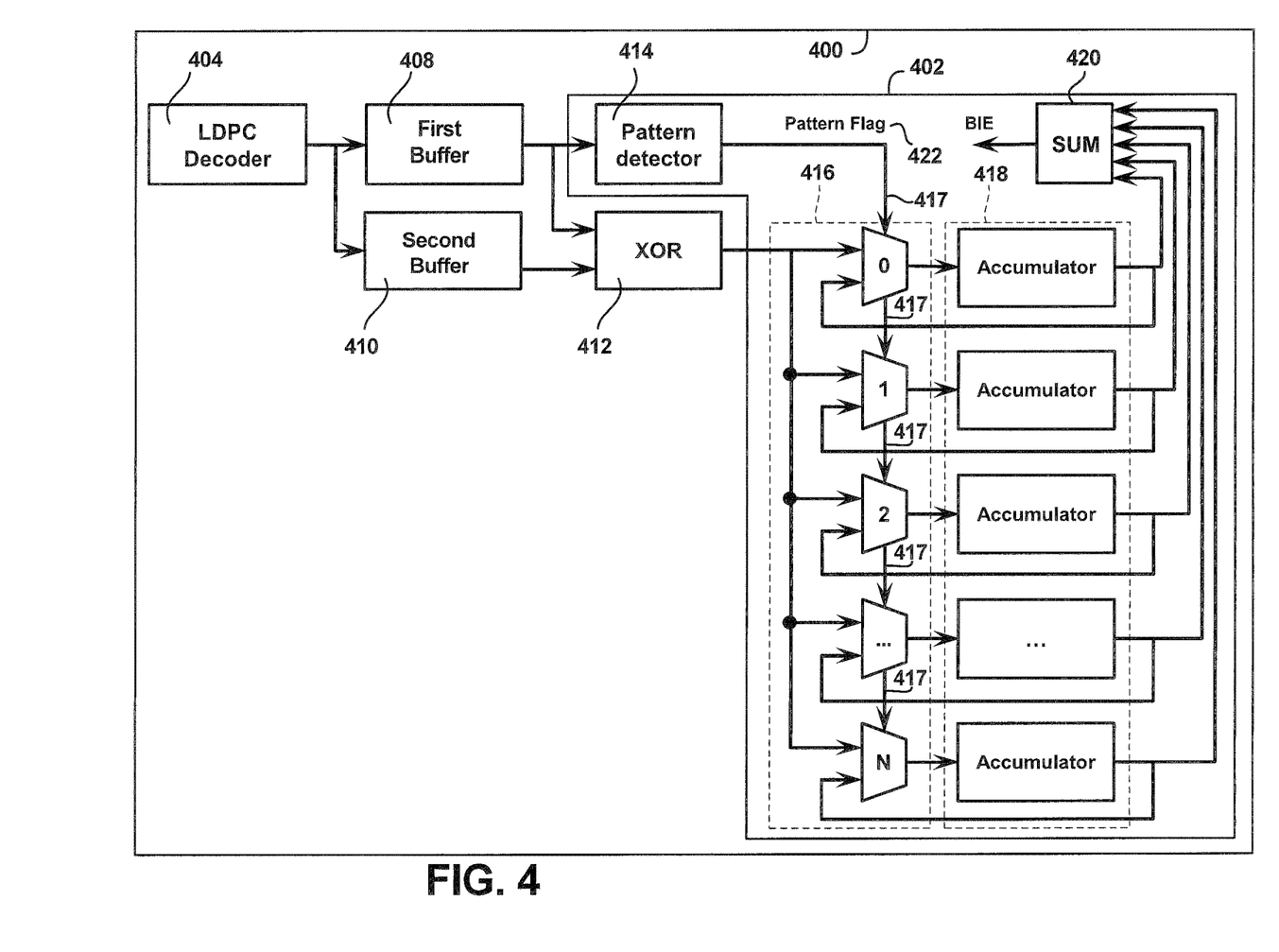
FIG. 4 is a bock diagram showing decoding circuitry with details of a BIE calculation circuit in accordance with one embodiment.

FIG. 4 is a block diagram showing decoding circuitry 400 with details of BIE calculation circuit 402 in accordance with one embodiment. Decoding circuitry 400 may be similar to decoding circuitry 129 of FIG. 1 and may be employed in a disc drive such as 100 of FIG. 1. As can be seen in FIG. 4, decoding circuitry 400 includes a LDPC decoder 404, a first buffer 408, a second buffer 410 and an exclusive or (XOR) circuit 412. The remaining components shown in FIG. 4 are included within BIE calculation circuit 402. In the embodiment of FIG. 4, BIE calculation circuit 402 is shown within decoding circuitry 400. However, in some embodiments, BIE calculation circuit 402 may be external to decoding circuitry 400. In such an embodiment, the BIE calculation circuit 402 is communicatively coupled to decoding circuitry 400. In some embodiments, decoding circuitry 400 and BIE calculation circuit 402 may be part of a single ASIC (e.g., a system on a chip (SOC)). In other embodiments, BIE calculation circuit 402 may comprise one or more ICs that are separate from an IC that includes decoding circuit 400. In some embodiments, instead of a hardware BIE calculation circuit 402, BIE calculations may be carried out by program code that is stored on a suitable non-transitory medium (e.g., a solid state memory) with which a controller communicates.

In some embodiments, LDPC decoder 404 may employ, for example, a soft output Viterbi algorithm (SOVA) that carries out iterative decoding operations on data read from a storage medium (e.g., one of discs 115 of FIG. 1) until a valid code word is achieved. Original data bits may then be extracted from the valid code word. First buffer 408 stores the original data bits extracted from the valid code word, which are the same as the written data bits without errors. Second buffer 410 stores uncorrected read data, which may have been read with one iteration of LDPC (e.g., read data from LDPC decoder 404 obtained before error correction operations are carried out on the read data). BIE calculation circuit 402 includes components that are capable of categorizing error bits in second buffer 410 based on desired patterns while referring to the written data in first buffer 408, and calculating BIE for each pattern by accumulating the error bits for the corresponding pattern.

As can be seen in FIG. 4, BIE calculation circuit includes a pattern detector 414, multiplexers 0-N 416, accumulators 0-N 418 and a summing circuit 420. During operation of circuit 400, data from buffers 408 and 410 are input into XOR circuit 412. XOR circuit 412 outputs a true indicator (e.g., a 1) when its two inputs (e.g., an input bit from first buffer 408 and a corresponding input bit from second buffer 410) differ from each other. XOR circuit 412 outputs a false indicator (e.g., a 0) when its two inputs (e.g., an input bit from first buffer 408 and a corresponding input bit from second buffer 410) are the same. For example, assuming that the 16 bit write data 302 (of FIG. 3) and 16 bit read data 304 (of FIG. 3) are input to XOR circuit 412 from buffers 408 and 410, respectively, XOR circuit 412 will output bit pattern 305 (of FIG. 3), which includes four separate is for four out of the 16 different bit comparisons.

For each bit comparison (e.g., a comparison between one bit from first buffer 408 and a corresponding bit from second buffer 410) that takes place in XOR circuit 412, pattern detector 414 detects a type of bit pattern to which the compared bits belong. This may be carried out by pattern detector 414 examining a bit from first buffer 408, which is also input to XOR circuit 412. Upon determining the type of pattern (using, for example, a suitable signal processing technique), pattern detector 414 outputs a pattern flag 422 that identifies that particular type of pattern. For example, a pattern flag 422 that identifies a 1T pattern is different from a pattern flag 422 that identifies a 2T pattern. The pattern flag 422 is input to select lines 417 of the respective multiplexers 416. For the example bit patterns 302 and 304 shown in FIG. 3, pattern detector 414 outputs a 1T pattern flag 422 when respective first bits (e.g., 310A) of the 16 bit write data 302 and 16 bit read data 304 are input into XOR circuit 412. The 1T pattern flag 422 selectively activates multiplexer 0, which also receives a 0 input from XOR circuit 412 due to both its inputs being 0. Multiplexers 1-N are not activated by 1T pattern flag 422. Multiplexor 0 outputs a 0 because, in this computation step, the input values that it receives are 0. Accumulator 0, which receives the output from multiplexor 0, is not incremented by the 0 that it receives.

In circuit 402, a 2T pattern flag is output by pattern detector 414 for pattern 316 of FIG. 3. The 2T pattern flag 422 activates only multiplexer 1 and corresponding accumulator 1. Similarly, for 3T patterns, 4T patterns, etc., different multiplexer and accumulator combinations are activated. BIEs for respective different patterns are input to summing circuit 420, which provides a pattern-dependent BIE value for the segment (e.g., a sector). BER for the segment may be calculated by employing the pattern-dependent BIE value in Equation 1 above.

Figure 5:
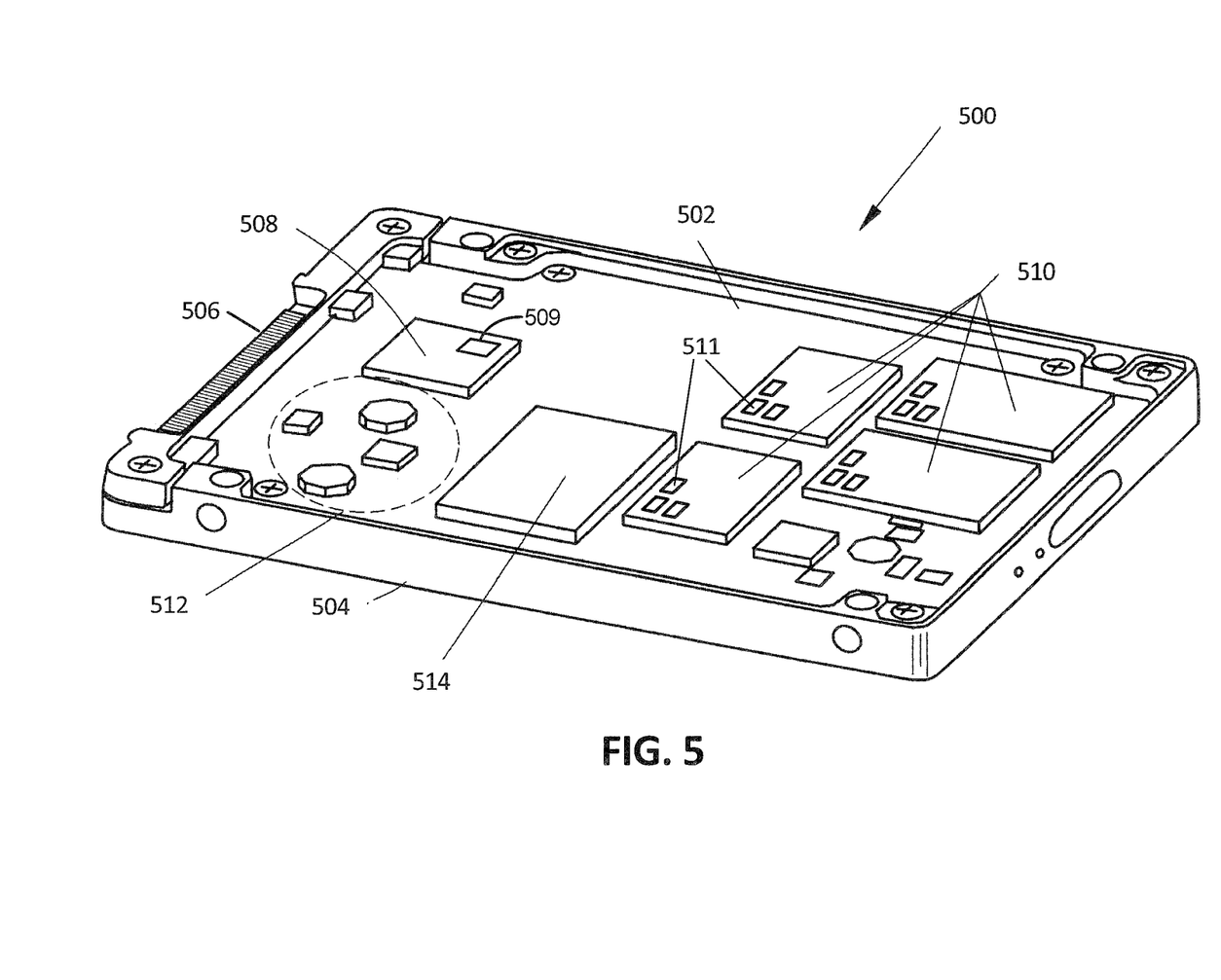
FIG. 5 is an oblique view of a solid state drive in which BIE may be measured in accordance with one embodiment.

FIG. 5 illustrates an oblique view of a solid state drive (SSD) 500 in which BIE may be measured in accordance with one embodiment. SSD 500 includes one or more circuit card assemblies 502 and typically includes a protective, supportive housing 504, a top cover (not shown), and one or more interface connectors 506. SSD 500 further includes a controller ASIC 508, one or more non-volatile memory devices 510, and power regulation circuitry 512. In some applications, SSD 500 further includes a power-backup energy storage device, such as a super-capacitor 514.

In SSD 500, the memory devices 510 are essentially the data storage media. SSD 500 may include erasure blocks 511 as the physical storage locations within memory device 510, which may include Flash memory devices, for example. Each erasure block 511 may be a segment for which BIE may be computed.

In accordance with certain aspects, the SSD 500 includes a circuit card assembly 502 that includes a connector 506 for connection to a host computer (not shown in FIG. 5). In accordance with certain aspects, the connector 506 includes a NVMe, SAS, FC-AL, SCSI, PCI-E, IDE, AT, ATA, SATA, IEEE-1394, USB or other interface connector adapted for connection to a host computer.

In SSD 500, ASIC controller 508 may include BIE calculation circuit 509, which may be similar to BIE calculation circuit 402 of FIG. 4. In such an embodiment, ASIC controller 508 and BIE calculation circuit 509 may be a single ASIC (e.g., a SOC). In some embodiments, BIE calculation circuit 509 may comprise one or more ICs that are separate from ASIC controller 508. In some embodiments, instead of a hardware BIE calculation circuit 509, BIE calculations may be carried out by program code that is stored in a memory within controller ASIC 508. The program code may be executed by a microprocessor within controller ASIC 508.

Data from a host computer (not shown in FIG. 5) is received in SSD 500 via connector 506. That received data is provided to drive controller ASIC 508. The received data is stored in erasure blocks 511 in one or more memory devices 510. In response to a request by a host computer for data stored in SSD 500, data is read from memory device(s) 510 to satisfy the request. BIE calculation circuit 509 may categorize the read data from an erasure block 511 into different data patterns in a manner described above, and then calculate BIEs for the different data patterns. Circuit 509 may sum the calculated BIEs to provide the segment-level BIE.

Figure 6:
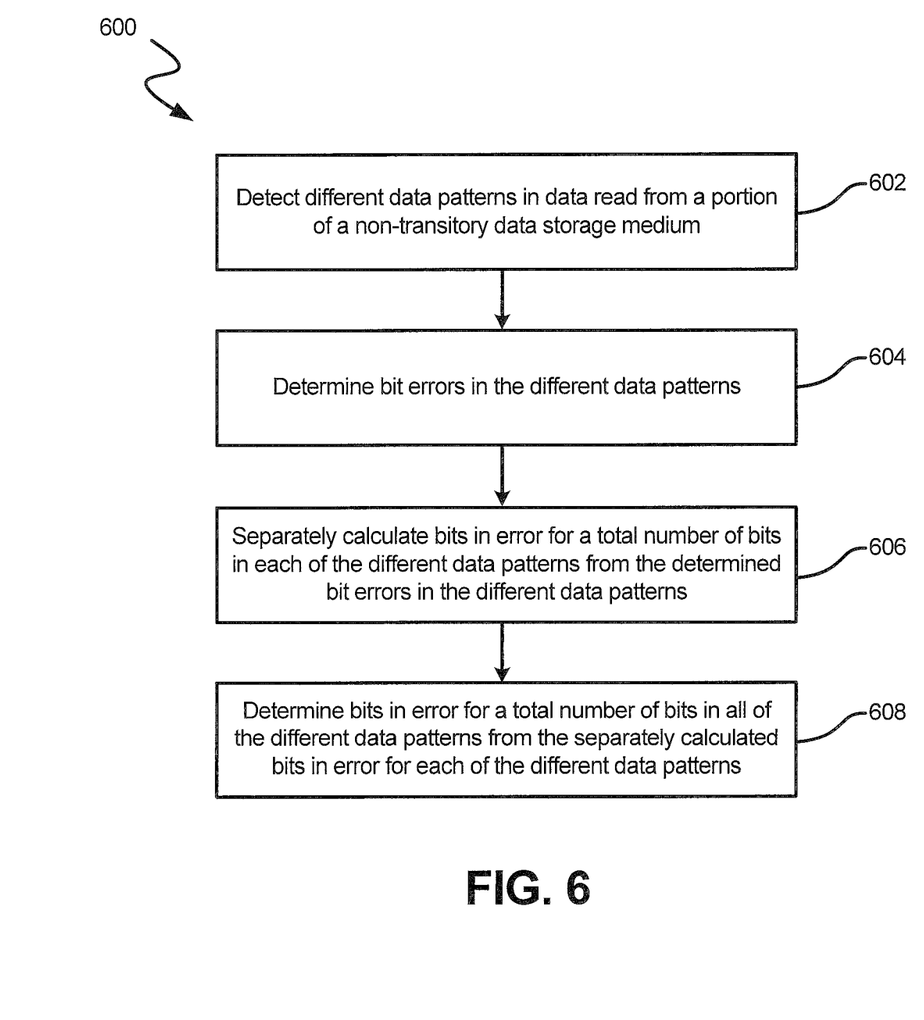
FIG. 6 is a flow diagram of a method embodiment.

FIG. 6 is a simplified flow diagram 600 of a method embodiment. The method includes, at step 602, detecting different data patterns in data read from a portion (e.g., a segment) of a non-transitory data storage medium. In some embodiments, the data read from the portion of the non-transitory data storage medium is data obtained by carrying out a read operation on any previously recorded data in the portion of the non-transitory data storage medium (e.g., the different data patterns are not predetermined at the time of recording). In such embodiments, detecting the different data patterns involves categorizing the read data obtained from the read operation on the previously recorded data having non-predetermined data patterns into the different data patterns. In other embodiments, predetermined data patterns may be written on the portion of the non-transitory data storage medium, and that data may be obtained during the read operation for detecting the different data patterns. At step 604, bit errors in the different data patterns are determined. The method further includes, at step 606, separately calculating bits in error for a total number of bits in each of the different data patterns from the determined bit errors in the different data patterns. At step 608, bits in error for a total number of bits in all of the different data patterns are determined from the separately calculated bits in error for each of the different data patterns.

In accordance with various embodiments, the methods described herein may be implemented as one or more software programs running on one or more microprocessors or controllers, such as the drive controller included in disc drive 100 of FIG. 1 or the ASIC 508 in SSD 500 of FIG. 5. Dedicated hardware implementations including, but not limited to, application specific integrated circuits, programmable logic arrays and other hardware devices can likewise be constructed to implement the methods described herein. Also, the methods described herein may be carried out in a test device/system that may include only a single disc and a suitable subset (less than all) of the elements shown in FIG. 1.

Patterned bit in error measurements may be utilized to improve certain technical aspects of the design of dives. One such aspect is write pre-compensation, which is a modification of the write signal (e.g., shifting transitions somewhat in time) in a manner to help ensure that the signal that will later be read back will be as close as possible to the unmodified write signal. Adjustments to pattern-dependent write functionality may also be made based on the obtained patterned bit in error measurements. Further, modifications to a SOVA may be implemented based on pattern bit in error measurements for different frequencies. For example, if patterned bit in error measurements show that the errors obtained for a 1T pattern are greater than the errors for 2T patterns, 3T patterns etc., then portions of the SOVA may be modified to address the greater 1T errors. Certain read parameters such as a continuous time filter (CTF) cut-off frequency may also be adjusted based on the one patterned bit in error measurements.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   establishing different data pattern types;
   detecting different data patterns in data read from a portion of a non-transitory data storage medium that fall into the different data pattern types;
   determining bit errors in each of the different data patterns;
   grouping subsets of the different data patterns according to the different data pattern types;
   separately determining pattern-dependent bits in error for a total number of bits in each of the different grouped subsets of the different data patterns from the determined bit errors in the different data patterns by employing a separate multiplexer and accumulator combination for each of the different established data pattern types; and
   generating a total pattern-dependent bits in error by summing the pattern-dependent bits in error for each of the different grouped subsets of the different data patterns.

2. The method of claim 1 and wherein at least some of the different data patterns have different frequencies.

3. The method of claim 1 and wherein at least some of the different data patterns have different configurations of bits.

4. The method of claim 1 and wherein detecting the different data patterns in the data read from the portion of the non-transitory data storage medium comprises detecting the different data patterns in data read from at least one of a sector of a disc, a track of a disc, and a block of a solid state memory.

5. The method of claim 1 and further comprising determining a bit error rate for the portion of the non-transitory data storage medium from the total pattern-dependent bits in error.

6. The method of claim 1, wherein grouping the subsets of the different data patterns according to the different data pattern types comprises:
   producing in a pattern detector a plurality of different pattern flags, each different pattern flag corresponding to one of the different data pattern types;

identifying each of the different data patterns as belonging to one of the different data pattern types by associating one of the plurality of different pattern flags with the data pattern.

7. The method of claim 6, wherein an error is determined in a respective data pattern by comparing decoded data from a first and a second data buffer.

8. A data storage device comprising:
a non-transitory data storage medium; and
a read element configured to read data stored on the data storage medium; and
a read channel, communicatively coupled to the read element, wherein the read channel is configured to:
detect different data patterns, in data read from a portion of the data storage medium, that fall into different established data pattern types;
determine bit errors in the different data patterns;
group subsets of the different data patterns according to the different data pattern types;
separately determine pattern-dependent bits in error for a total number of bits in each of the different grouped subsets of the different data patterns from the determined bit errors in the different data patterns by employing a separate multiplexer and accumulator combination for each of the different established data pattern types; and
generate a total pattern-dependent bits in error by summing pattern-dependent bits in error for each of the different grouped subsets of the different data patterns.

9. The data storage device of claim 8 and wherein the data storage medium is a disc, and wherein the portion of the data storage medium is a sector of the disc.

10. The data storage device of claim 8 and wherein the data storage medium is a disc, and wherein the portion of the data storage medium is a track of the disc.

11. The data storage device of claim 8 and wherein the data storage medium is a solid state medium, and wherein the portion of the data storage medium is a block of the solid state medium.

12. The data storage device of claim 8 and wherein the read channel is further configured to determine a bit error rate for the portion of the data storage medium from the total pattern-dependent bits in error.

13. The data storage device of claim 8 and wherein at least some of the different data patterns have different frequencies.

14. The data storage device of claim 8 and wherein at least some of the different data patterns have different configurations of bits.

15. A method comprising:
writing different predetermined data patterns to different portions of a segment of a non-transitory data storage medium;
reading the different predetermined data patterns from the different portions of the segment of the data storage medium to obtain read data patterns;
determining bit errors in the read data patterns; and
calculating a segment-level bit in error value for the segment from the determined bit errors by:
producing in a pattern detector a plurality of pattern flags, each pattern flag identifying one of the read data patterns;
supplying the pattern flag for each of the different read data patterns to a plurality of multiplexers, each pattern flag activating a one of the plurality of multiplexers;
accumulating the bits in error from each multiplexer using a plurality of accumulators, an accumulator coupled to each multiplexer; and
summing the bits in error from the plurality of accumulators.

16. The method of claim 15 and wherein the data storage medium is a disc, and wherein the segment comprises at least one sector of the disc.

17. The method of claim 15 and wherein the data storage medium comprises a disc, and wherein the segment comprises at least one track of the disc.

18. The method of claim 15 and wherein the data storage medium is a solid state data storage medium, and wherein the segment comprises at least on block of the solid state data storage medium.

19. The method of claim 15 and further comprising determining a bit error rate for the segment from the segment-level bit in error value.

* * * * *

UNITED STATES PATENT AND TRADEMARK OFFICE
CERTIFICATE OF CORRECTION

PATENT NO. : 10,552,252 B2
APPLICATION NO. : 15/250617
DATED : February 4, 2020
INVENTOR(S) : Jeon Seokhun et al.

Page 1 of 1

It is certified that error appears in the above-identified patent and that said Letters Patent is hereby corrected as shown below:

In the Claims

In Column (10), Line 3 of Claim 18, change "on" to --one--.

Signed and Sealed this
Thirty-first Day of March, 2020

Andrei Iancu
*Director of the United States Patent and Trademark Office*